US009367779B2

(12) United States Patent
Kitamura et al.

(10) Patent No.: US 9,367,779 B2
(45) Date of Patent: Jun. 14, 2016

(54) ENCRYPTION PROCESSING DEVICE, ENCRYPTION PROCESSING SYSTEM AND CONTROL METHOD FOR ENCRYPTION PROCESSING DEVICE (75) Inventors: Tamakazu Kitamura, Nagano (JP); Naohiko Koakutsu, Shiojiri (JP); Toshihiro Tsukada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 491 days.

(21) Appl. No.: 12/986,137

(22) Filed: Jan. 6, 2011

(65) Prior Publication Data
US 2011/0167277 A1    Jul. 7, 2011

(30) Foreign Application Priority Data

Jan. 7, 2010 (JP) ................................. 2010-002002
Feb. 5, 2010 (JP) ................................. 2010-024063

(51) Int. Cl.
*G06F 11/30* (2006.01)
*G06K 15/00* (2006.01)
*G06F 21/60* (2013.01)
*G06F 21/72* (2013.01)
*G06F 3/12* (2006.01)
*H04L 29/06* (2006.01)

(52) U.S. Cl.
CPC .......... *G06K 15/4095* (2013.01); *G06F 21/608* (2013.01); *G06F 21/72* (2013.01); *G06F 3/1222* (2013.01); *G06F 3/1238* (2013.01); *G06F 3/1284* (2013.01); *H04L 63/105* (2013.01)

(58) Field of Classification Search
CPC ..... G06F 21/72; G06F 21/608; G06F 3/1284; G06F 3/1222; G06F 3/1238; G06K 15/4095; H04L 63/105

USPC .......................................................... 713/189
See application file for complete search history.

(56) References Cited

U.S. PATENT DOCUMENTS

| 4,718,784 A * | 1/1988 | Drisko ............................ 400/68 |
| 2004/0001207 A1* | 1/2004 | Nishimura ..................... 358/1.2 |
| 2004/0012816 A1* | 1/2004 | Minowa ......................... 358/2.1 |

(Continued)

FOREIGN PATENT DOCUMENTS

| CN | 1503503 A | 6/2004 |
| JP | 07-295892 A | 11/1995 |

(Continued)

OTHER PUBLICATIONS

Hewlett Packard, "HP PCL/PJL Reference PC5 Printer Language Technical Reference Manual part I", First Edition—Oct. 1992, pp. 1-1 to 16-28.*

(Continued)

*Primary Examiner* — Luu Pham
*Assistant Examiner* — Canh Le (57) ABSTRACT

A processing device is provided. A first storage unit stores a correspondence table which is indicative of a correspondence relationship between attributes of data and encryption levels for encrypting data. An obtaining unit obtains data. A first determination unit determines an encryption level according to an attribute of the data obtained by the obtaining unit, using the correspondence table stored in the first storage unit. An encryption unit encrypts the data obtained by the obtaining unit in the encryption level determined by the first determination unit. A second storage unit stores the data encrypted by the encryption unit.

9 Claims, 9 Drawing Sheets

(56) References Cited

U.S. PATENT DOCUMENTS

| | | |
|---|---|---|
| 2004/0139339 A1 | 7/2004 | Yeh et al. |
| 2004/0187022 A1* | 9/2004 | Asada ................ H04L 63/105 726/14 |
| 2004/0255141 A1* | 12/2004 | Hodder et al. ............... 713/200 |
| 2005/0144469 A1* | 6/2005 | Saitoh ......................... 713/189 |
| 2006/0031674 A1* | 2/2006 | Sakurai ............... G06F 21/608 713/166 |
| 2007/0165248 A1* | 7/2007 | Utsunomiya et al. .......... 358/1.1 |
| 2009/0033980 A1* | 2/2009 | Morris et al. ................ 358/1.15 |
| 2009/0214033 A1* | 8/2009 | Nakagata ............... G09C 5/00 380/243 |
| 2010/0071077 A1* | 3/2010 | Morris et al. .................... 726/36 |
| 2011/0019231 A1* | 1/2011 | Nakamura ............ G06F 3/1215 358/1.15 |

FOREIGN PATENT DOCUMENTS

| | | | |
|---|---|---|---|
| JP | 2000-010929 A | | 1/2000 |
| JP | 2007-150466 A | | 6/2007 |
| JP | 2008-242907 | * | 10/2008 |
| JP | 2009-140030 A | | 6/2009 |

OTHER PUBLICATIONS

Thierry Moreau, "Server Management Tools for Trust Anchor Key Management," Feb. 2, 2006, pp. 1-35.*

Christoph Busch et al., "Sensitivity Labels and Invisible Identification Markings in Human-Readable Output," Proceedings of SPIE vol. 4675, 2002, pp. 149-157.*

* cited by examiner

| PRINTER COMMAND INFORMATION TCP | SECURITY LEVEL INFORMATION TSL |
|---|---|
| TEXT CHARACTER DATA | HIGH |
| GRAPHIC IMAGE PRINTING COMMAND | MEDIUM |
| PRINTING CONDITION SETTING COMMAND | LOW |
| PRINTER STATUS OBTAINING COMMAND | ENCRYPTION UNNECESSARY |

| RANGE OF HEADER | CONTENTS | |
|---|---|---|
| | ENCRYPTION TYPE | ACTUAL DATA LENGTH |
| 1~32 | HIGH SECURITY LEVEL | 1~32 |
| 33~64 | MEDIUM SECURITY LEVEL | 1~32 |
| 65~96 | LOW SECURITY LEVEL | 1~32 |
| 97~255 | RAW DATA | 1~159 |

ENCRYPTION PROCESSING DEVICE, ENCRYPTION PROCESSING SYSTEM AND CONTROL METHOD FOR ENCRYPTION PROCESSING DEVICE

The disclosures of Japanese Patent Applications No. 2010-002002 filed on Jan. 7, 2010 and No. 2010-024063 filed on Feb. 5, 2010, including specifications, drawings and claims are incorporated herein by reference in their entireties.

BACKGROUND

The present invention relates to a processing device, a processing system, and a control method for the processing device.

From the viewpoint of securing security of data, there is known a technique where, for a processing system including a processing device such as a printing device, data used in the processing device is encrypted and then is transmitted among devices (see the patent document 1). Also, likewise, there is a technique where, in a processing device having a processing unit which performs a printing process, for example, a fiscal printer which prints and stores data such as received payment information, data used in the processing unit is encrypted and is transmitted inside the device.

Patent Document 1: JP-A-2009-140030

However, in the case where data used in the processing unit is encrypted and then transmitted, if all of the data is encrypted or decrypted in the same level, there is a problem in that a processing load is generated in the processing device, and thus processing efficiency in the processing device is lowered.

SUMMARY

It is therefore an object of at least one embodiment of the present invention to reduce processing loads caused by encryption or decryption in a processing device or a processing system which encrypts and transmits data used in a processing device or a processing unit.

In order to achieve at least one of the above-described objects, according to a first aspect of the embodiments of the present invention, there is provided a processing device, comprising: a first storage unit that stores a correspondence table which is indicative of a correspondence relationship between attributes of data and encryption levels for encrypting data; an obtaining unit that obtains data; a first determination unit that determines an encryption level according to an attribute of the data obtained by the obtaining unit, using the correspondence table stored in the first storage unit; an encryption unit that encrypts the data obtained by the obtaining unit in the encryption level determined by the first determination unit; and a second storage unit that stores the data encrypted by the encryption unit.

According to a second aspect of the embodiments of the present invention, there is provided a control method for a processing device including a control unit which executes: obtaining data; determining an encryption level according to an attribute of the obtained data using a correspondence table which is indicative of a correspondence relationship between attributes of data and encryption levels for encrypting data; encrypting the obtained data in the determined encryption level; and storing the encrypted data.

According to the processing device and the control method for a processing device, since the encryption level is changed according to an attribute of the obtained data, it is possible to reduce a processing load in the processing device which encrypts the data. For example, a low encryption level is given to data of an attribute which does not need security, and thus an encryption process is finished in a short time, thereby reducing the processing load.

The processing device may further comprise a printing unit that performs printing on a medium, and the data may be used in the printing by the printing unit. In this case, the data used in the printing by the printing unit is encrypted by changing an encryption level according to an attribute of the data, and thus a processing load can be reduced.

In the processing device, the data obtained by the obtaining unit may include at least one of: character information indicating characters; graphic image printing information for printing graphic images; printing condition information indicating printing conditions for printing the characters on the medium; and status obtaining information for obtaining a status of the printing unit, and in the correspondence relationship, an encryption level for encrypting the data including the character information may be higher than an encryption level for encrypting the data including the graphic image printing information, the encryption level for encrypting the data including the graphic image printing information may be higher than an encryption level for encrypting the data including the printing condition information, and the data including the status obtaining information may be not to be encrypted. In this case, the processing device gives a higher encryption level to the data including the character information than the data including the graphic image printing information, gives a higher encryption level to the data including the graphic image printing information than the data including the printing condition information, and performs no encryption for the data including the status obtaining information. Therefore, it is possible to reduce a processing load. Also, by lowering an encryption level of information which does not need security, it is possible to secure appropriate confidentiality and reduce a processing load.

The processing device may further comprise: a connection unit that is connectable to an external device; a receiving unit that receives an input from the external device via the connection unit; a second determination unit that determines the encryption level of the data stored in the second storage unit when the receiving unit receives the input; a decryption unit that decrypts the data stored in the second storage unit based on the encryption level determined by the second determination unit; and a transmission unit that transmits the data decrypted by the decryption unit to the external device via the connection unit. In this case, the data stored in the encrypted state in the storage unit can be decrypted and transmuted to the external device only in the case that an allowed predetermined input exists.

In the processing device, the data stored in the second storage unit may include at least one of fiscal data and electronic journal data, and in this case, the processing device can function as a fiscal device. The fiscal data includes sales data, tax rate data or the like, and is used to record tax collection or the like. The electronic journal (EJ) data includes individually specified data regarding sales of sold products and is used to record verification of the sales or the like. Both of them include data related to security and thus are preferably stored in the encrypted state as described above.

The present invention can be realized by various aspects, and, for example, may be realized by a printer, a data control device, a computer, a register, or the like, each of which has the processing device. Also, the present invention can be realized by a data storage method, a data control method, a computer program used to realize these methods or functions of the devices, a recording medium which records the computer program, data signals realized in carrier waves by including the computer program, and the like.

According to a third aspect of the embodiments of the present invention, there is provided a processing system that constitutes the above-described processing device, the processing system comprising a first processing device, a second processing device and a third processing device, wherein the first processing device includes the first storage unit, the obtaining unit, the first determination unit; the encryption unit and the second storage unit, wherein the second processing device includes: a receiving unit that receives the data encrypted by the encryption unit from the first processing device; a second determination unit that determines the encryption level of the data received by the receiving unit; a decryption unit that decrypts the data received by the receiving unit based on the encryption level determined by the second determination unit; and a processing control unit that controls the third processing device, using the data decrypted by the decryption unit.

According to the processing system of the present invention, since an encryption level is changed according to an attribute of the data used in the third processing device, a processing load in encryption or decryption can be reduced in the processing device which encrypts the data for transmission.

In the processing system, the third processing device may be a printing device that performs printing on a medium, and the processing control unit may be a printing control unit that controls the printing device, using the data. In this case, since an encryption level is changed according to an attribute of the data used in the printing device, a processing load in encryption or decryption can be reduced in the printing device which encrypts the data for transmission.

In the processing system, the first processing device may further include: a receiving unit that receives control data for controlling the processing system; and a generation unit that generates data used in the third processing device according to the control data received by the receiving unit. In this case, since an encryption level is changed according to an attribute of information included in the generated data in the processing system which encrypts data, which is data generated in response to the control data used to control the processing system and is used in the third processing device, and transmits the encrypted data, a processing load in encryption OF decryption can be reduced.

According to a fourth aspect of the embodiments of the present invention, there is provided a processing system, comprising a processing device and a printing device, wherein the processing device includes: a storage unit that stores a correspondence table which is indicative of a correspondence relationship between attributes of data and encryption levels for encrypting data; an obtaining unit that obtains data; a first determination unit that determines an encryption level according to an attribute of the data obtained by the obtaining unit, using the correspondence table stored in the storage unit; an encryption unit that encrypts the data obtained by the obtaining unit in the encryption level determined by the first determination unit; and a transmission unit that transmits the data encrypted by the encryption unit to the printing device, wherein the printing device includes: a receiving unit that receives the data encrypted by the encryption unit from the processing device; a second determination unit that determines the encryption level of the data received by the receiving unit; a decryption unit that decrypts the data received by the receiving unit based on the encryption level determined by the second determination unit; and a printing control unit that controls a printing unit, using the data decrypted by the decryption unit.

According to the processing system, since an encryption level is changed according to an attribute of data used in the printing device, a processing load caused by encryption or decryption can be reduced in the processing system which encrypts the data for transmission.

The present invention can be realized by various aspects, and, for example, may be realized by a printer, a printer system, a printing control device, a computer, a data transmission and reception system, or the like. Also, the present invention can be realized by a printing control method, a data transmission and reception method, and a computer program used to realize these methods or functions of the devices, a recording medium which records the computer program, data signals realized in carrier waves by including the computer program, and the like.

DETAILED DESCRIPTION OF THE EMBODIMENTS

Hereinafter, a printing device including a processing device related to the present invention as a part thereof will be described based on embodiments with reference to the accompanying drawings.

A. First Embodiment

A1. Configuration of Printing Device

Figure 1:
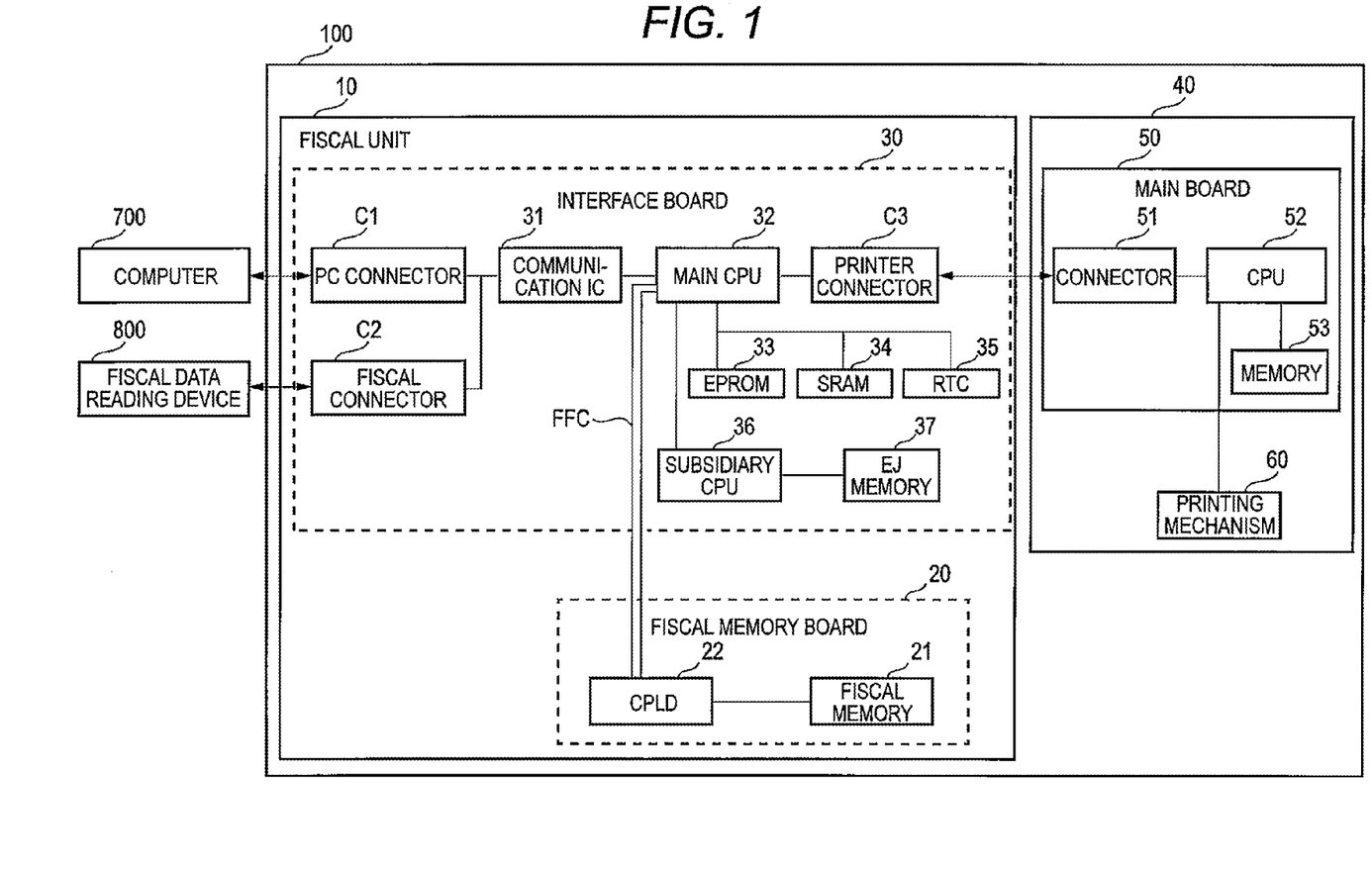
FIG. 1 is an explanatory diagram schematically illustrating a configuration of a printing device according to a first embodiment.

FIG. 1 is an explanatory diagram schematically illustrating a configuration of a printing device according to a first embodiment. A printing device 100 in this embodiment is a primer for accounting which performs receipt printing for printing accounting receipts to pass to customers and which performs journal printing for confirming sales data, based on fiscal command data, described later, obtained from a computer 700. The printing device 100 includes a fiscal unit 10 and a printer main body unit 40 (printing unit).

The fiscal unit 10 is connected to each of the computer 700 and the printer main body unit 40, functions as an interface, and is a MB (universal interface board) which exchanges data with each of the computer 700 and the printer main body unit 40. The fiscal unit 10 has a fiscal memory board 20 and an interface board 30. The fiscal memory board 20 and the interface board 30 are connected to each other via a flexible flat cable FFC. The interface board 30 includes a PC connector C1, a fiscal connector C2, a printer connector C3, a communication IC 31, a main CPU 32, an EPROM 33, an SRAM 34, an RTC 35, a subsidiary CPU 36, and an EJ memory 37. The fiscal unit 10 includes a storage unit such as the EPROM 33, the SRAM 34, and the EJ memory 37 and is an example of "a processing device (a first processing device)" in Claims.

The PC connector C1 is connected to the computer 700 and is used to transmit and receive data including data for the controlling the fiscal unit 10 (hereinafter, referred to as "fiscal command data") or the like between the computer 700 and the fiscal unit 10. The data transmission between the computer 700 and the fiscal unit 10 may employ a serial scheme using a USB, an RS-232C, or the like, or a parallel scheme or the like using an SCSI and the like. The fiscal connector C2 is only used to read fiscal data stored in a fiscal memory 21 which is described later or sates data or the like stored in the EJ memory 37, and is used to transmit and receive data between it and a fiscal data reading device 800. The printer connector C3 is connected to the printer main body unit 40, and is used to transmit and receive data including data for controlling the printer main body unit 40 (hereinafter, referred to as "printer command data") or the like between the fiscal unit 10 and the printer main body unit 40. The data transmission between the fiscal unit 10 and the printer main body unit 40 may employ, for example, a serial scheme or the like of a transmission rate of 1 Mbps (bit per second).

The communication IC 31 is connected to the PC connector C1 and the fiscal connector C2, and exchanges data with the computer 700 or the fiscal data reading device 800. The main CPU 32 controls the entire operations of the fiscal unit 10. For example, the main CPU 32 reads and writes data from and in the fiscal memory 21. The main CPU 32 executes control programs stored in the EPROM 33 to realize a plurality of functional. blocks which will be described later with reference to FIG. 2.

The EPROM 33 stores data used in the main CPU 32 to perform various controls, or stores the control programs (firmware). The EPROM 33 stores an LUT (look-up table) (a first storage unit) which is a printer command and security level conversion table (a correspondence table, which is hereinafter simply referred to as "a PCSL conversion table"), described later with reference to FIG. 4. The SRAM 34 is used as a work area for various processes performed by the main CPU 32. The RTC 35 is a real-time clock and keeps track of the date and the time. The EJ memory 37 is an electronic journal memory, and stores sales data or the like. The subsidiary CPU 36 controls writing or reading of sales data or the like in or from the EJ memory 37 in response to an instruction from the main CPU 32. Also, the subsidiary CPU 36 transmits the sales data or the like stored in the EJ memory 37 to the fiscal data reading device 800 via the fiscal connector C2, in response to an instruction from the main CPU 32.

The fiscal memory board 20 includes the fiscal memory 21 and a CPLD 22. The fiscal memory 21 and the CPLD 22 are coated with an epoxy resin. The fiscal memory 21 stores data including sales data, tax rate data or the like (hereinafter, referred to as "fiscal data"). The fiscal memory 21 uses an OTPROM (One Time Programmable ROM) which can only be written once at one address or a rewritable non-volatile flash ROM, and writes data regarding sales for one day sent from the computer 700 therein. The CPLD 22 controls reading and writing of data from and in the fiscal memory 21.

The printer main body unit 40 includes a main board 50 and a printing mechanism 60. The main board 50 is connected to the fiscal unit 10 and the printing mechanism 60, and exchanges data with the fiscal unit 10 and the printing mechanism 60. When receiving the printer command data from the fiscal unit 10, the main board 50 controls the printing mechanism 60 according to contents included in the printer command data.

The main board 50 includes a connector 51, a CPU 52, and a memory 53. The connector 51 exchanges data between it and the printer connector C3 of the interface board 30. The CPU 52 controls an entire operation of the printer main body unit 40. The CPU 52 executes control programs stored in the memory 53 to realize a plurality of functional blocks which will be described later with reference to FIG. 8. The memory 53 stores data used in the CPU 52 to perform various controls, or control programs (firmware).

The printing mechanism 60 includes various hardware mechanisms used to perform receipt printing or journal printing, such as, for example, a printing head performing printing on paper, a paper transport unit which transports paper, and a cutting unit which cuts paper.

A2. Details of Fiscal Unit

Figure 2:
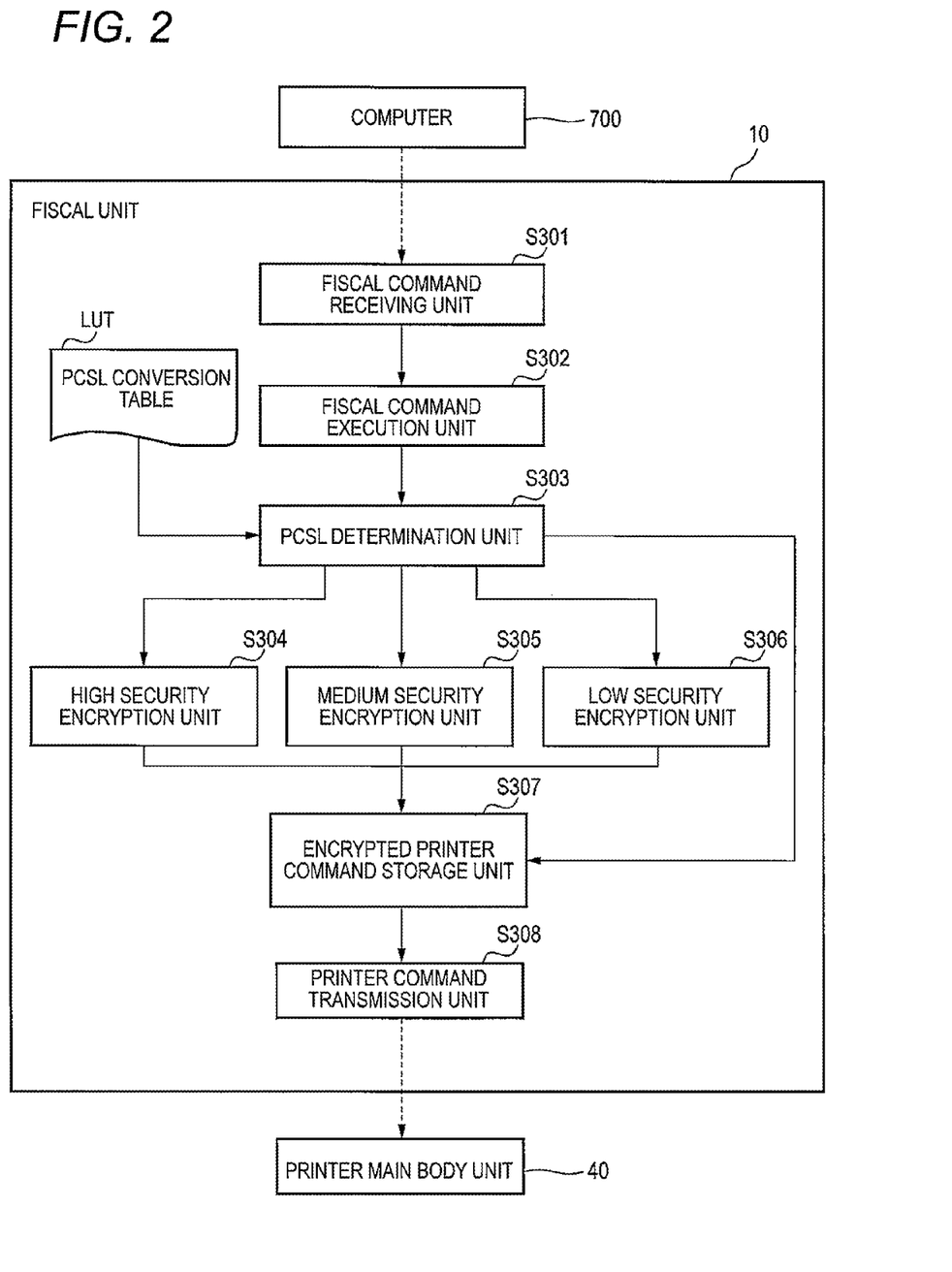
FIG. 2 is an explanatory diagram illustrating functional blocks of a fiscal unit according to the first embodiment.

FIG. 2 is an explanatory diagram illustrating functional blocks of the fiscal unit according to the first embodiment. The main CPU 32 executes the control programs stored in the EPROM 33, thereby realizing a fiscal command receiving unit 301, a fiscal command execution unit 302, a printer command and security level determination unit (a first determination unit, which is hereinafter simply referred to as "a PCSL determination unit") 303, a high security encryption unit 304, a medium security encryption unit 305, a low security encryption unit 306, an encrypted printer command storage unit 307 (a second storage unit), and a printer command transmission unit 308.

The fiscal command receiving unit 301 receives fiscal command data including data regarding accounting receipts from the computer 700. The fiscal command receiving unit 301 transmits data (hereinafter, also referred to as "fiscal response data") including a result corresponding to a command (hereinafter, also referred to as "a fiscal command") included in the fiscal command data to the computer 700.

Figure 3A:
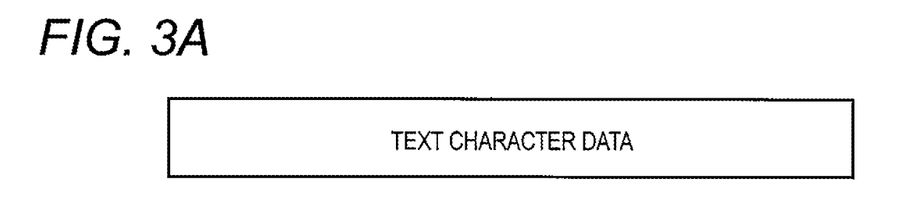
FIGS. 3A to 3D are explanatory diagrams illustrating printer command data.
Figure 3B:
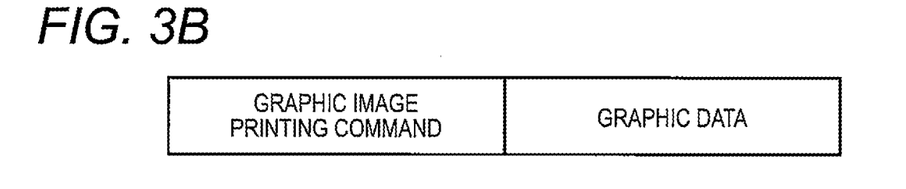
Figure 3C:
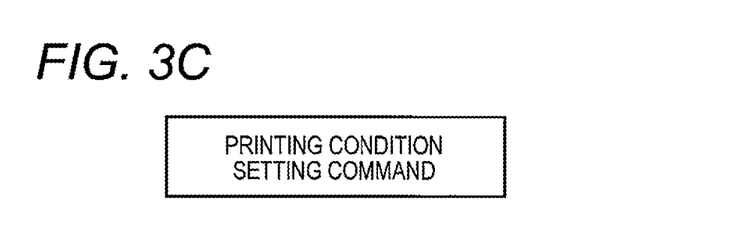
Figure 3D:
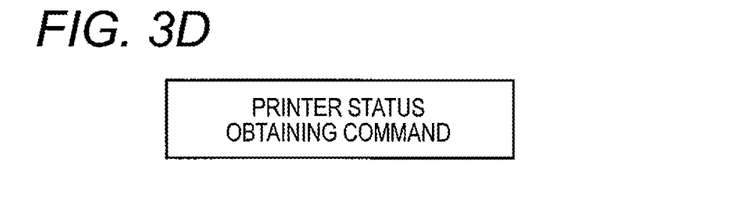

If the fiscal command receiving unit 301 receives fiscal command data, the fiscal command execution unit 302 performs an operation determined for each fiscal command. For example, if the fiscal command data includes items, numbers, monetary amounts, tax rates, and the like of purchased goods, the fiscal command execution unit 302 performs calculation of a subtotal or a total amount, calculation of tax rate, or the like, to thereby generate fiscal data which is stored in the fiscal memory 21. In addition, when the fiscal command includes content indicating a receipt is required to be printed, the fiscal command execution unit 302 generates printer command data by attaching a serial number, a format of a receipt, and a unique number of a printer to the generated fiscal data. p FIGS. 3A to 3D are explanatory diagrams illustrating examples of the printer command data. The printer command data is data used when the printing mechanism 60 performs printing, and information included therein has a plurality of attributes. Specifically, for example, there exists data or the like including, as shown in FIG. 3A, text character data used to print characters such as "banana," "100 yen," "900 yen in total," "store name" or the like, as shown in FIG. 3B, data constituted by a graphic image printing command used to print a graphic image such as a logo of a store and graphic data representing an image such as characters, as shown in FIG. 3C, data including a printing condition setting command used to set printing conditions when an image such as characters is printed on a medium, and as shown in FIG. 3D, data including a printer status obtaining command used to obtain a status such as error in the printer, absence of paper, opening and closing of a cover, or the like. In this embodiment, as well as the graphic image printing command, the printing condition setting command, and the printer status obtaining command, the text character data is included, and they are also simply referred to as "printer commands." The printer commands included in printer command data represent the attributes of information included in the printer command data. Also, the printing condition when an image such as characters is printed on a medium includes, for example, a character decoration such as types (fonts) or sizes of a character, a bold face, italics, underline, or the like, a layout such as center arrangement, right justification, line break, or the like, control conditions of the printing mechanism 60 such as a printing density or a printing speed, and the like. The fiscal command execution unit 302 stores the generated printer command data in the EPROM 33.

If the fiscal command execution unit 302 generates the printer command data, the PCSL determination unit 303 determines encryption levels to be used to encrypt the printer command data according to contents of the printer commands included in the printer command data. The PCSL determination unit 303 determines the encryption levels by referring to a PCSL conversion table described later. Detailed contents of the PCSL conversion table will be described below.

Figure 4:
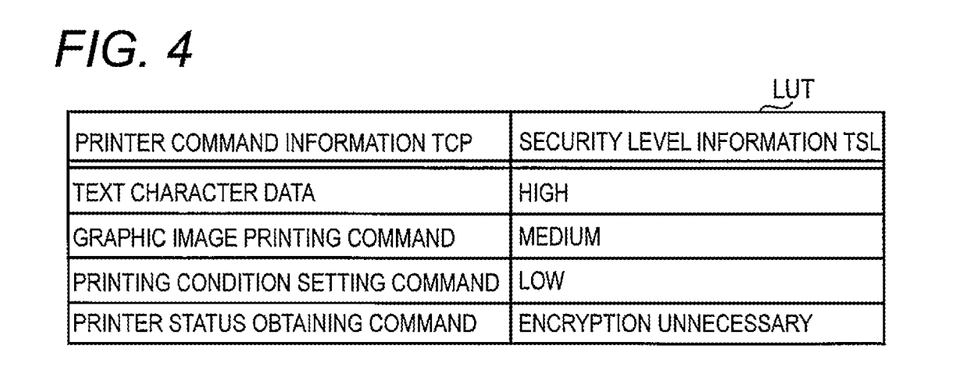
FIG. 4 is an explanatory diagram illustrating contents of a PCSL conversion table.

FIG. 4 is an explanatory diagram illustrating contents of the PCSL conversion table. The PCSL conversion table LUT shown in FIG. 4 is a table used to decide the encryption level according to contents of the printer commands included in the printer command data, and includes information regarding content of the printer commands (hereinafter, also referred to as "printer command information") TPC, and information regarding an encryption level corresponding to each printer command (hereinafter, also referred to as "security level information") TSL.

The respective fields of the printer command information TPC show various printer commands used to control the printer main body unit 40. In this embodiment, the text character data, the graphic image printing command, the printing condition setting command, and the printer status obtaining command are set.

The respective fields of the security level information TSL show encryption levels used to encrypt the printer command data. The encryption level indicates complexity of processes when encryption and decryption are performed, a security level is heightened as the encryption level is heightened, a complex encryption process is performed for the printer command data, and thus time to process the encryption and decryption is necessary. In this embodiment, in addition to the encryption of three levels, a high security level, a medium security level, and a low security level, a level where the encryption is not performed is also set.

The high security encryption unit 304 encrypts printer command data which is determined as a high security level by the PCSL determination unit 303. The high security encryption unit 304 performs a more complex encryption process than the medium security encryption unit 305 and the low security encryption unit 306. The medium security encryption unit 305 encrypts printer command data which is determined as a medium security level by the PCSL determination unit 303. The medium security encryption unit 305 performs a more complex encryption process than the low security encryption unit 306. The low security encryption unit 306 encrypts printer command data which is determined as a low security level by the PCSL determination unit 303. Encryption methods performed by the high security encryption unit 304, the medium security encryption unit 305, and the low security encryption unit 306 are not particularly limited, but, for example, may employ a data compression technique such as run-length coding or Huffman coding. In other words, the printer command data can be encrypted using the run-length coding or the Huffman coding.

In the run-length coding, a compression rate can be increased corresponding to printer command data having a high security level. In other words, a compression can be performed at a high level corresponding to the printer command data having the high security level. Specifically, for data having contents "AAABBBB," if it is determined as a high security level, there is no limitation on the maximum digits of the run-length, and the data is compressed such that A has three digits and B has four digits like "A3B4." On the other hand, if determined as a low security level, there is a limitation (for example, two digits) on the maximum digits of the run-length, and the data is compressed such that A has two digits, A has one digit, B has two digits, and B has two digits, like "A2AB2B2."

In the Huffman coding as well, a compression rate can be increased corresponding to printer command data having a high security level. In other words, the compression rate can be increased by coding data using a code having a shorter digit as the security level of the printer command data is heightened. Specifically, when data which is determined as a high security level is coded by using a code of two digits of "01," data which is determined as a low security level is coded by using a code of four digits of "0101." In this way, by changing the digits of the codes used during the coding according to the security level, the compression rate can be changed.

Figure 5:
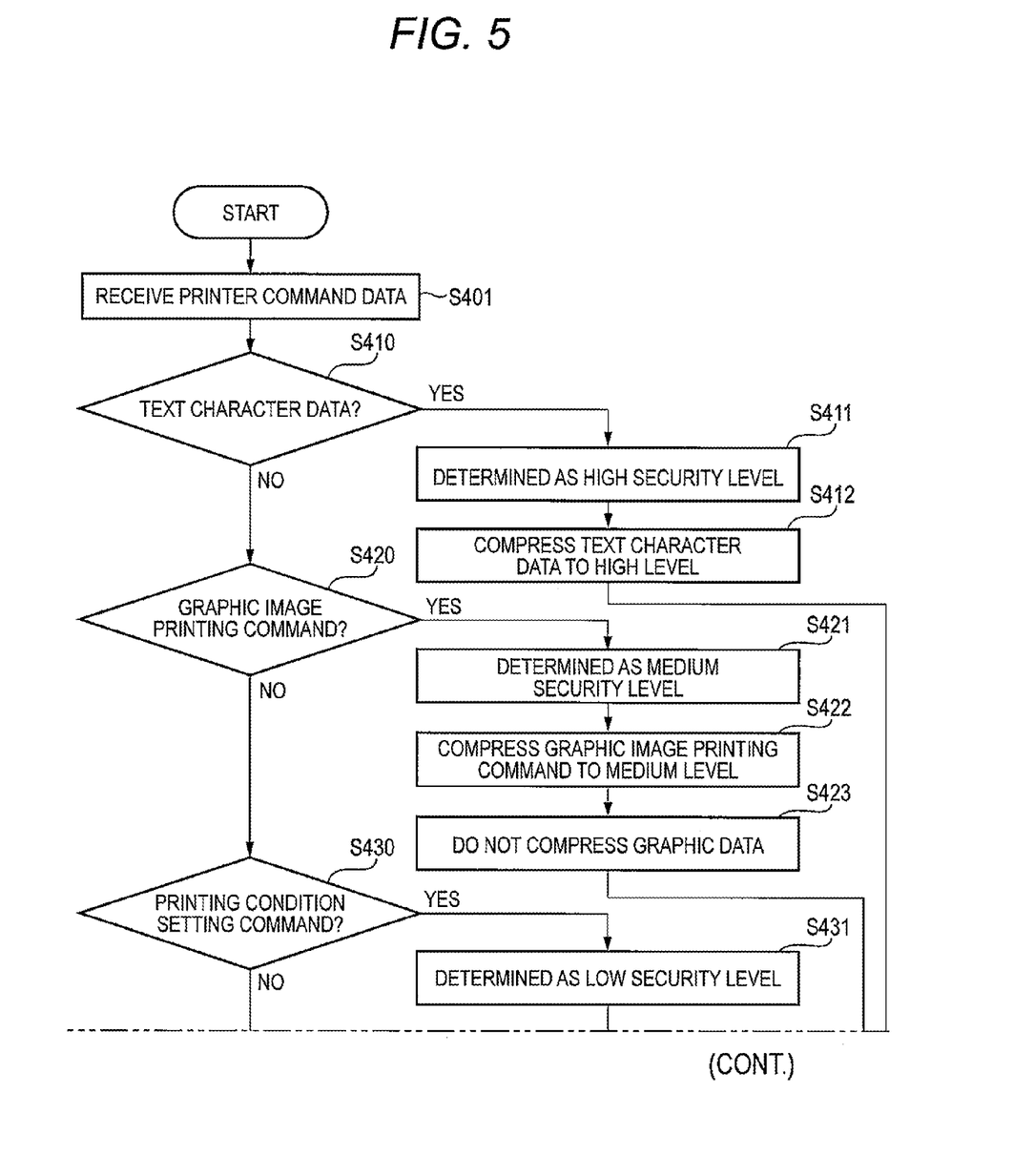
FIG. 5 is a flowchart illustrating operations of a PCSL determination unit and each security encryption unit.

FIG. 5 is a flowchart illustrating operations of the PCSL determination unit and each security encryption unit. If the printer command data generated by the fiscal command execution unit 302 is stored in the EPROM 33 (step S401), the PCSL determination unit 303 determines whether or not text character data is included in the printer command data (step S410). In this embodiment, the PCSL determination unit 303 determines, as the text character data, text data which does not include "ESC" which is a code indicating a command, in its leading portion, for example, "banana," "100 yen," "900 yen in total," or "store name." The text character data is designated as a high security level since it includes individually detailed information with regards to accounting such as a monetary amount.

If the text character data is included in the printer command data (step S410: YES), the PCSL determination unit 303 determines a security level of the printer command data as a high security level (step S411). Thereafter, the high security encryption unit 304 compresses the text character data to a high level (step S412). The text character data is encrypted at the high level by the compression in the high security encryption unit 304.

If the text character data is not included in the printer command data (step S410: NO), the PCSL determination unit 303 determines whether or not a graphic image printing command is included in the printer command data (step S420). In this embodiment, the printer command data used to print a graphic image is constituted by the graphic image printing command "ESC GRAPHIC QUANTITY" and graphic data subsequent thereto. The PCSL determination unit 303 determines whether or not the graphic image printing command is included based on whether or not "ESC GRAPHIC QUANTITY" is included in the leading portion of the printer command data. The graphic image is designated as a medium security level since there are cases where information related to a store with regards to accounting is included such as a logo of the store.

If the graphic image printing command is included in the printer command data (step S420: YES), the PCSL determination unit 303 determines a security level of the printer command data as a medium security level (step S421). Thereafter, the medium security encryption unit 305 compresses the graphic image printing command included in the printer command data to a medium level (step S422). The graphic image printing command is encrypted at the medium level by the compression in the medium security encryption unit 305.

In contrast, the medium security encryption unit 305 does not compress the graphic data (step S423). That is to say, in the printer command data including the graphic image printing command, only the graphic image priming command part "ESC GRAPHIC QUANTITY" is compressed, and the graphic data part is not compressed. Thereby, as compared with when the entire printer command data is compressed, a processing load is reduced as much as the graphic data is not compressed, and security can be secured by the encryption of the command.

When the graphic image printing command is not included in the printer command data (step S420: NO), the PCSL determination unit 303 determines whether or not a printing condition setting command is included in the printer command data (step S430). In this embodiment, the PCSL determination unit 303 performs the determination based on whether or not character decoration such as "ESC BOLD-FACE" or "ESC UNDER-LINE" is included in the leading portion of the printer command data, or a command used in a layout. The primer command data is designated as a low security level since information directly related to accounting is not included.

If the printing condition setting command is included in the printer command data (step S430: YES), the PCSL determination unit 303 determines of a security level of the printer command data as a low security level (step S431). Thereafter, the low security encryption unit 306 compresses the printing condition setting command to a low level (step S432). The printing condition setting command is encrypted at the low level by the compression in the low security encryption unit 306.

When the printing condition setting command is not included in the printer command data (step S430: NO), the PCSL determination unit 303 determines whether or not a printer status obtaining command is included in the printer command data (step S440). in this embodiment, the PCSL determination unit 303 performs the determination based on whether or not a command such as "ESC COVER-STATUS" or "ESC PAPER-STATUS" which is used to obtain a printer main body status, for example, opening and closing of a cover, or a paper status, for example, presence and absence of paper, is included in the leading portion of the printer command data. Security is not necessary for the printer status obtaining command since information related to accounting is not included.

When the printer status obtaining command is included in the printer command data (step S440: YES), the PCSL determination unit 303 determines that encryption for the printer command data is not necessary (step S441). In other words, the printer status obtaining command included in the printer command data is not compressed (step S442). In addition, if security is necessary such as a case where information or the like regarding the fiscal memory is included in the printer status obtaining command, a security level may be determined as a low security level, then printer status obtaining command may be compressed to a low level, and then encrypted at the low level.

When the printer status obtaining command is not included in the printer command data (step S440: NO), the printer commands shown in the PCSL conversion table LUT do not exist. For this reason, the PCSL determination unit 303 determines that encryption for the printer command data is not necessary (step S450). In other words, the printer command data not included in the printer commands shown in the PCSL conversion table LUT is not compressed (step S460). The encrypted printer command data and the printer command data for which it has been determined that encryption is not necessary (hereinafter, "the encrypted printer command data" includes the printer command data for which it has been determined that encryption is not unnecessary) are stored in the encrypted printer command storage unit 307 (step S470). Hereinafter, the operations of the PCSL determination unit and each security encryption unit will be described.

Referring to FIG. 2 again, the encrypted printer command storage unit 307 stores the encrypted printer command data as described above. In this embodiment, the encrypted printer command storage unit 307 is constituted by the EPROM 33 or the fiscal memory 21. The printer command transmission unit 308 transmits the encrypted printer command data stored in the encrypted printer command storage unit 307 to the printer main body unit 40. The printer command transmission unit 308 packetizes and transmits the encrypted printer command data.

Figure 6:
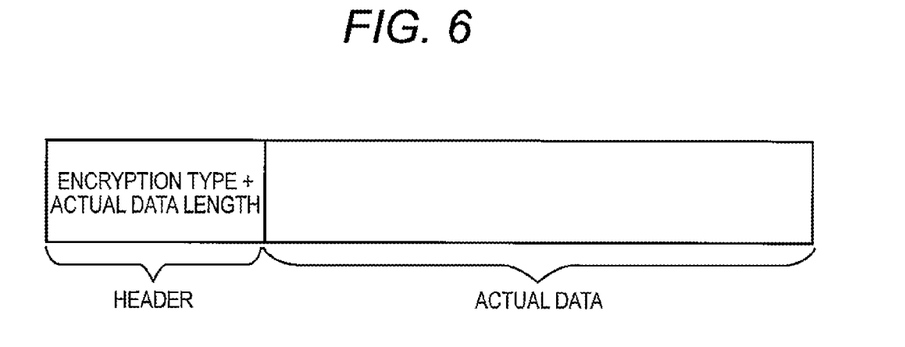
FIG. 6 is an explanatory diagram illustrating a configuration of the printer command data which is packetized.
Figure 7:
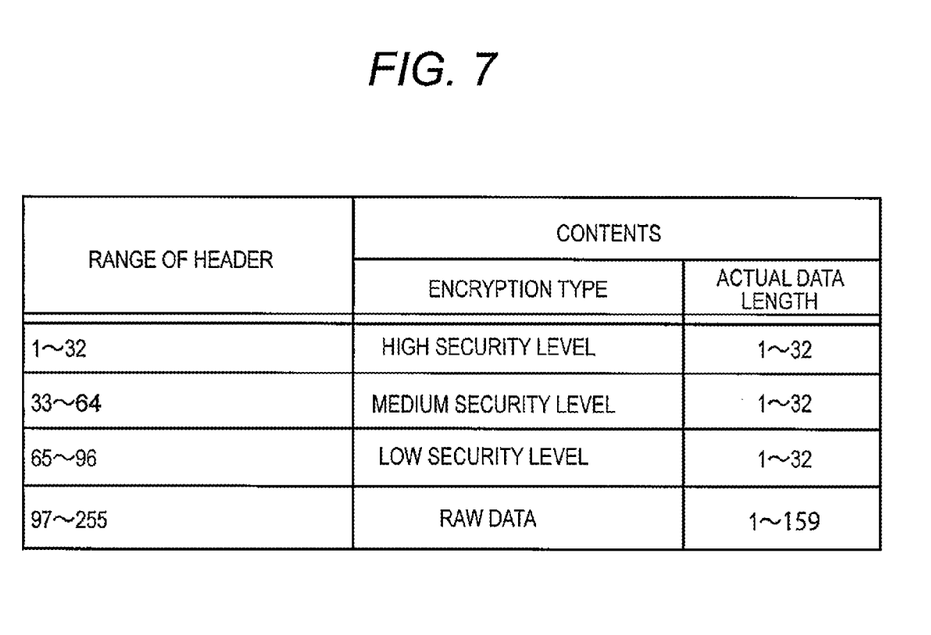
FIG. 7 is an explanatory diagram illustrating contents of the printer command data which is packetized.

FIG. 6 is an explanatory diagram illustrating a configuration of the packetized printer command data. FIG. 7 is an explanatory diagram illustrating contents of the packetized printer command data. The packetized printer command data is constituted by a header of one byte positioned in the leading portion and actual data subsequent thereto, as shown in FIG. 6. The header indicates an encryption type and a length of the actual data. The length of the actual. data is variable. As shown in FIG. 7, if a range of the header (a value indicated by the header) is 1 to 32, the encryption type is the "high security level," and a value of the header indicates a length of the actual data. If a range of the header is 33 to 64, the encryption type is the "medium security level," and a value obtained by subtracting 32 from the value of the header indicates a length of the actual. data. If a range of the header is 65 to 96, the encryption type is the "low security level," and a value obtained by subtracting 64 from the value of the header indicates a length of the actual data. If a range of the header is 97 to 255, it indicates raw data which is not encrypted, and a value obtained by subtracting 96 from the value of the header indicates a length of the actual data.

A3. Details of Printer Main Body Unit

Figure 8:
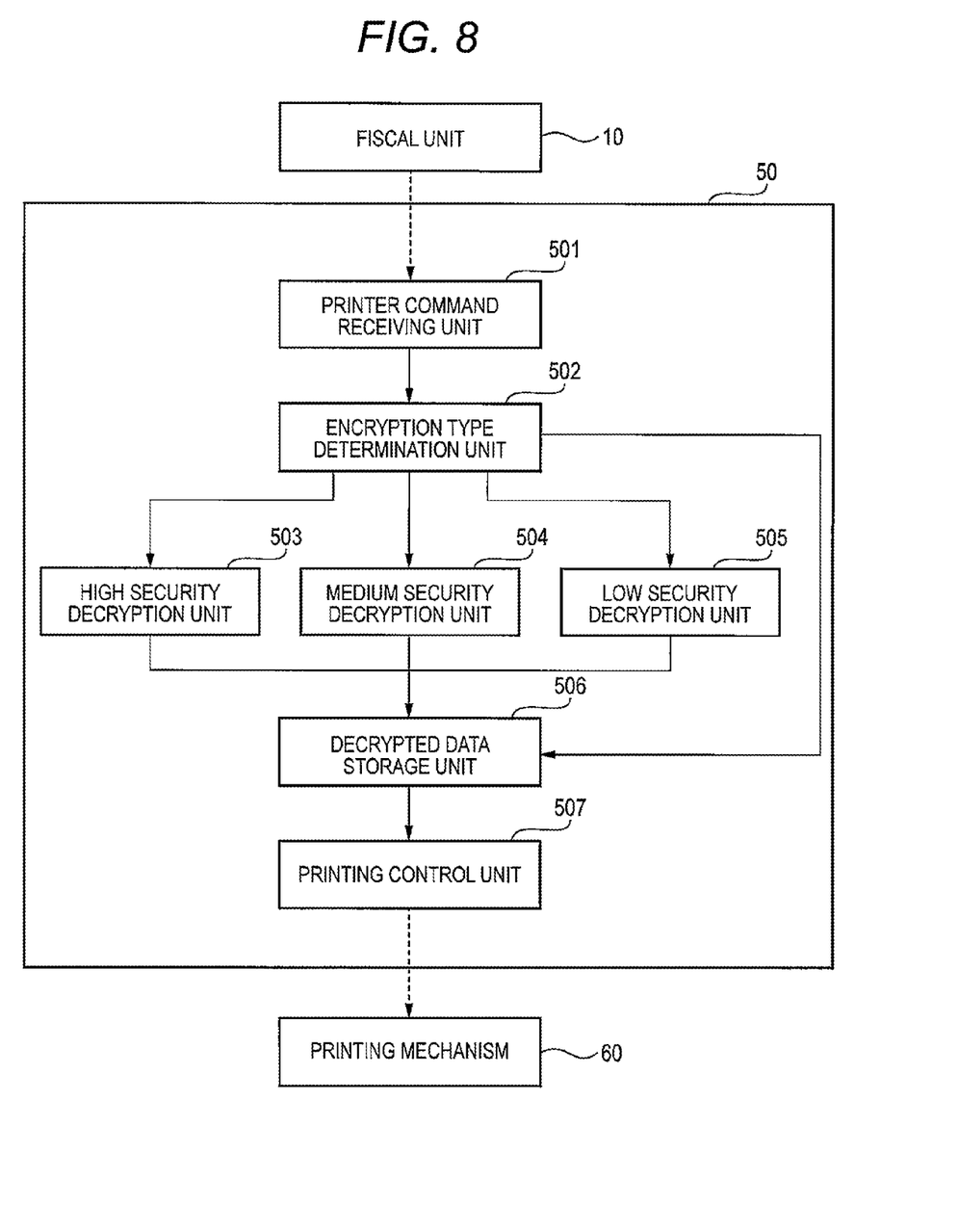
FIG. 8 is an explanatory diagram illustrating functional blocks of a printer main body unit.

FIG. 8 is an explanatory diagram illustrating functional blocks of the primer main body unit 40, The CPU 52 executes control programs stored in the memory 53 to thereby realize a printer command receiving unit 501, an encryption type determination unit 502, a high security decryption unit 503, a medium security decryption unit 504, a to low security dectyption unit 505, a decrypted data storage unit 506, and a printing control unit 507.

The primer command receiving unit 501 receives the encrypted printer command data from the fiscal unit 10. The encryption type determination unit 502 determines encryption types of the encrypted printer command data. Specifically, as described with reference to FIG. 7, since the header of the packetized printer command data indicates encryption types, the encryption type determination unit 502 determines the encryption types based on the header.

The high security decryption unit 503 decrypts printer command data which is determined as being encrypted at a high security level by the encryption type determination unit 502. The medium security decryption unit 504 decrypts printer command data which is determined as being encrypted at a medium security level by the encryption type determination unit 502. The low security decryption unit 505 decrypts printer command data which is determined as being encrypted at a low security level by the encryption type determination unit 502. The decrypted printer command data is stored in the decrypted data storage unit 506.

The printing control unit 507 interprets the decrypted printer command data and controls the printing mechanism 60 according to the printer commands. Specifically, if text character data is included in the printer command data, the printing control unit 507 controls the printing head and the paper transport unit and prints characters represented by the text character data on paper. Also, if a graphic image printing command and graphic image data are included in the printer command data, the printing control unit 507 prints images represented by the graphic image data on paper. Further, if a printing condition setting command is included in the printer command data, the printing control unit 507 prints characters based on character decoration or layout according to the command. In this way, a receipt including accounting information is printed. Also, if a printer status obtaining command is included in the printer command data, the statuses of the printer and paper are transmitted to the fiscal unit 10.

In relation to "a processing device" in Claims, the printer command data in this embodiment is an example of "data" in Claims. The EPROM 33 in this embodiment is an example of "an obtaining unit" and "a first storage unit" in Claims. The PCSL determination unit 303 in this embodiment is an example of "a first determination unit" in Claims. The encrypted printer command storage unit 307 in this embodiment is an example of "a second storage unit" in Claims. The printing mechanism 60 in this embodiment is an example of "a printing unit" in Claims.

In relation to "a processing system" in Claims, the fiscal unit 10 in this embodiment is an example of "a first processing unit" in Claims. The main board 50 in this embodiment is an example of "a second processing device" in Claims. The printing mechanism 60 in this embodiment is an example of "a third processing device" in Claims. The printer command data in this embodiment is an example of "data used in the processing unit" in Claims. The EPROM 33 in this embodiment is an example of "an obtaining unit" and "a storage unit" in Claims. The fiscal command receiving unit 301 in this embodiment is an example of "a first receiving unit" in Claims. The fiscal command execution unit 302 in this embodiment is an example of "a generation unit" in Claims. The fiscal command data in this embodiment is an example of "control data used to control the processing system" in Claims. The PCSL determination unit 303 in this embodiment is an example of "a first determination unit" in Claims. The printer command transmission unit 308 in this embodiment is an example of "a first transmission unit" in Claims. The printer command receiving unit 501 in this embodiment is an example of "a second receiving unit" in Claims. The encryption type determination unit 502 in this embodiment is an example of "a second determination unit" in Claims.

As described above, according to the fiscal unit 10 related to the first embodiment described above, since the encryption level is changed according to an attribute of information included in the printer command data, a processing load can be reduced when the data is encrypted. Specifically, the fiscal unit 10 changes a degree of complexity of encryption according to an attribute of information included in the printer command data when the printer command data is encrypted and stored in the encrypted printer command storage unit 307, and thereby a processing load can be reduced as compared with when the entire printer command data is collectively encrypted. Also, since a level of encryption is changed according to the importance of information included in the printer command data, necessary security can be secured.

In the related art, in order to prevent intentional modification of data such as printer command data stored in the fiscal unit, there is known a technique where the printer command data is encrypted and stored. However, since the entire printer command data is collectively encrypted in the related art, processing efficiency in the entire device may be reduced due to the processing load such as the encryption. By applying the present invention to the fiscal printer, it is possible to secure necessary security and reduce the processing load caused by the process such as the encryption.

According to the fiscal unit 10 related to the first embodiment, an encryption level when the printer command data including the text character data is encrypted is higher than that when the printer command data including the graphic image printing command is encrypted. An encryption level when the printer command data including graphic image printing command is encrypted is higher than that when the printer command data including the printing condition setting command is encrypted. The printer command data including the printer status obtaining command is not encrypted. Thereby, it is possible to secure necessary security and reduce the processing load. Specifically, the text character data represents characters printed on paper, and thus it is information for which suppression of fraud is most necessary. For this reason, it is possible to suppress fraud by setting the highest encryption level. For the printer command data including the graphic image printing command, the graphic image printing command is encrypted and the graphic data is not encrypted, and thus it is possible to reduce the processing load caused by the encryption and efficiently suppress fraud. Since there is little concern about fraud with regard to the printer command data including the printer status obtaining command, the processing load can be suppressed by not encrypting the printer command data.

B. Second Embodiment

B1. Configuration of Printing Device

Although the aspect where the fiscal unit 10 only encrypts the printer command data has been described in the first embodiment, the fiscal unit 10 according to the second embodiment not only encrypts the printer command data but also decrypts the encrypted printer command data. The fiscal unit 10 according to the second embodiment decrypts the encrypted printer command data which is encrypted by any one of the high security encryption unit 304, the medium security encryption unit 305, and the low security encryption unit 306 in the first embodiment in response to a request from a fiscal data reading device 800 (an external device) and then is stored in the encrypted printer command storage unit 307, and transmits the decrypted printer command data to the fiscal data reading device 800. In a configuration of a printing device 100 related to the second embodiment, functional blocks other than functional blocks which are realized by the main CPU 32 executing control programs are the same as those in the first embodiment, and thus the description thereof will be omitted.

B2. Details of Fiscal Unit

Figure 9:
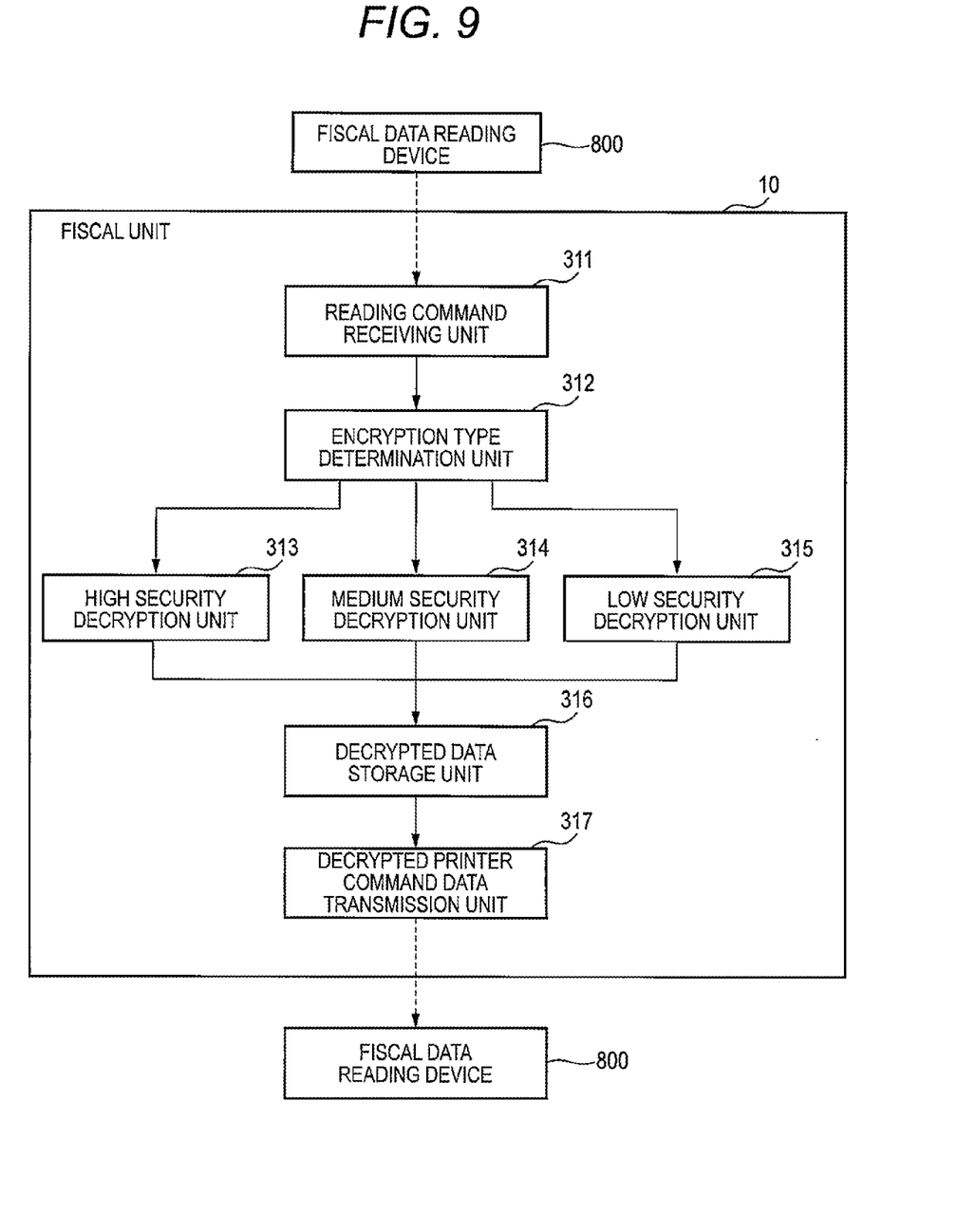
FIG. 9 is an explanatory diagram illustrating functional blocks of a fiscal unit according to a second embodiment.

FIG. 9 is an explanatory diagram illustrating functional blocks of the fiscal unit according to the second embodiment. The main CPU 32 executes control programs stored in the EPROM 33 to thereby realize a reading command receiving unit 311 (receiving unit), an encryption type determination unit 312 (a second determination unit), a high security decryption unit 313, a medium decryption unit 314, a low security decryption unit 315, a decrypted data storage unit 316, and a decrypted printer command data transmission unit 317 (transmission unit).

The reading command receiving unit 311 receives a request (hereinafter referred to as "reading command") for reading printer command data from the fiscal data reading device 800 connected via the fiscal connector C2. The encryption type determination unit 312 determines an encryption type of the encrypted printer command data stored in the encrypted printer command storage unit 307. The encryption type determination unit 312 has the same ftinction as the encryption type determination unit 502 realized in the printer main body unit 40 according to the first embodiment.

The high security decryption unit 313 decrypts printer command data which is determined as being encrypted at a high security level by the encryption type determination unit 312. The medium security decryption unit 314 decrypts printer command data which is determined as being encrypted at a medium security level by the encryption type determination unit 312. The low security decryption unit 315 decrypts printer command data which is determined as being encrypted at a low security level by the encryption type determination unit 312. The decrypted printer command data is stored in the decrypted data storage unit 316.

The high security decryption unit 313, the medium security decryption unit 314, and the low security decryption unit 315 respectively have the same functions as the high security decryption unit 503, the medium security decryption unit 504, and the low security decryption unit 505 realized in the printer main body unit 40 according to the first embodiment. The decrypted printer command data transmission unit 317 transmits the decrypted printer command data stored in the decrypted data storage unit 316, to the fiscal data reading device 800.

The fiscal data reading device 800 in this embodiment is an example of "an external device" in Claims. The fiscal connector C2 in this embodiment is an example of "a connection unit" in Claims. The reading command receiving unit 311 in this embodiment is an example of "a receiving unit" in Claims. The encryption type determination unit 312 in this embodiment is an example of "a second determination unit" in Claims. The high security decryption unit 313, the medium decryption unit 314, and the low security decryption unit 315 in this embodiment are an example of "decryption units" in Claims. The decrypted printer command data transmission unit 317 in this embodiment is an example of "a transmission unit" in Claims.

As described above, according to the fiscal unit 10 related to the second embodiment described above, the fiscal unit 10 not only encrypts the printer command data but also decrypts the encrypted printer command data. Thereby, the fiscal unit 10 can decrypt the printer command data which is stored in the encrypted state and transmit the decrypted printer command data to an external device such as the fiscal data reading device 800. In other words, according to the fiscal unit 10 in this embodiment, it is possible to suppress intentional modification of the stored printer command data and obtain arbitrarily decrypted printer command data.

C. Modified Examples

Also, this invention is not limited to the above-described embodiments but can be realized by various aspects without departing from the scope of the invention, and, for example, the invention may be modified as follows.

C1. Modified Example 1

Although in the present embodiment, the fiscal unit 10 encrypts the printer command data by changing a degree of complexity of encryption according to an attribute of information included in data, the data which is encrypted by changing a degree of complexity of encryption is not limited to the printer command data. For example, the fiscal unit 10 may encrypt the fiscal data by changing a degree of complexity of encryption according to an attribute of information included in the data and store the encrypted fiscal data in the fiscal memory 21. Also, the fiscal unit 10 may temporarily store data which has been encrypted by changing a degree of complexity of encryption, encrypted data may be overwritten by other data, and data may be destroyed by turning off the power of the device.

C2. Modified Example 2

Figure 10:
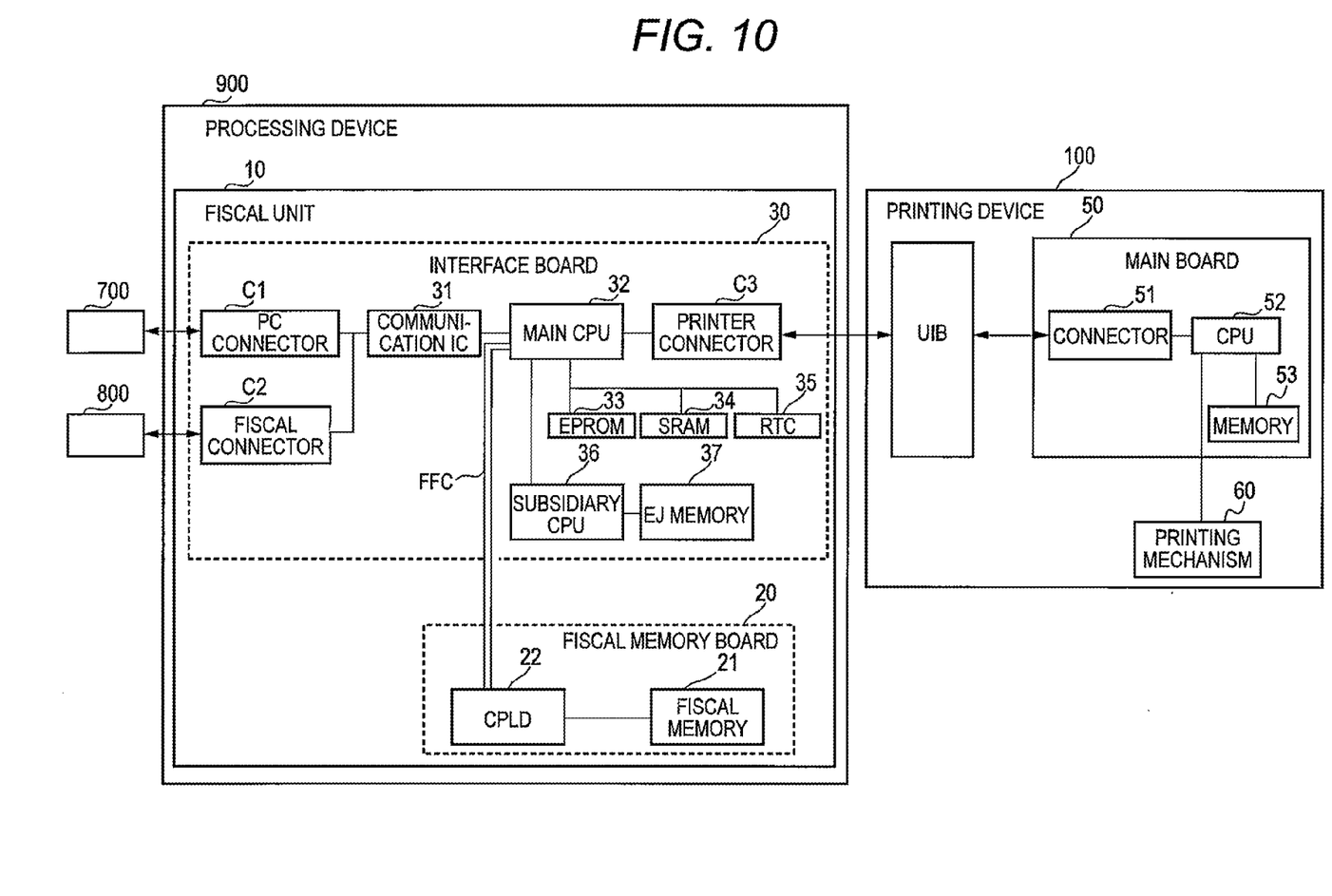
FIG. 10 is an explanatory diagram schematically illustrating a configuration of a printing device according to a modified example.

FIG. 10 is an explanatory diagram schematically illustrating a configuration of a printing device according to a modified example. Although the fiscal unit 10 is disposed in the printing device 100 in the present embodiment, the fiscal unit 10 may be disposed in a processing device 900 connected to the computer 700 and the printing device 100 as shown in FIG. 10. In this case, since printer command data which is encrypted by changing an encryption level according to an attribute of information included in the printer command data can be transmitted to the printing device 100 from the processing device 900, it is possible to reduce a load of an encryption process in the processing device 900 or a load of a decryption process in the printing device 100. In this way, the present invention can be applied to data exchanged inside the printing device 100 and further to data exchanged between devices. Data which is encrypted by changing a degree of complexity of encryption according to an attribute of information included in the data is not limited to the printer command data, and thus the fiscal unit 10 can be also applied not only to a facsimile, a copier, a register, a scanner, a computer, and a digital camera, but also to an inner constituent element of an automated teller machine or the like. In addition, in relation to "a printing system" in Claims, the printer connector C3 in this embodiment is an example of "a first transmission unit" in Claims. Also, the connector 51 in this embodiment is an example of "a second receiving unit" in Claims.

C3. Modified Example 3

Although in the PCSL conversion table in FIG. 4, the text character data is set to the high security level, the graphic image printing command is set to the medium security level, the printing condition setting command is set to the low security level, and the printer status obtaining command is set to no encryption in the present embodiment, these security levels are only examples, and security levels corresponding to the respective printer commands may be configured differently. Also, although in the present embodiment, the PCSL conversion table shows four printer commands, the text character data, the graphic image printing command, the printing condition setting command, and the printer status obtaining command, other commands may be shown, and at least a portion thereof may be not shown. Further, although in the present embodiment, the PCSL conversion table shows the correspondence relationships between the printer commands and the security levels, as long as a correspondence relationship between an attribute of information included in the printer command data and a security level is shown, correspondence relationships between information other than the printer commands and security levels may be shown. The information other than the printer command data refers to, for example, the size of the printer command data, a fiscal command used to generate the printer command data, or the like, as well as characters and image data included in the printer command data.

C4. Modified Example 4

Although in the present embodiment, the security levels for encryption are classified into three levels, the security levels are not limited to the three levels but may be classified into other levels. Also, although in the present embodiment, the printer command data which is transmitted without the encryption exists, all of the printer command data may be encrypted.

C5. Modified Example 5

Although the printing device 100 related to the present embodiment encrypts the printer command data by the runlength coding or the Huffman coding, the encryption may be performed by other methods such as a DES (data encryption standard), an AES (advanced encryption standard), an RSA (Rivest Shamir Adlemn), or the like.

C6. Modified Example 6

The printing device 100 related to the present embodiment may replace a portion of configuration realized by hardware with software in the above-described embodiment, and, alternately, may replace a portion of configuration realized by software with hardware.

C7. Modified Example 7

Although in the present embodiment, for the printer command data transmitted from the interface board 30 to the main board 50, the printing device 100 which changes the encryption levels according to an attribute of information included in the printer command data has been described, as long as a device has two boards such as the interface board 30 and the main board 50, the present invention may be applied to devices other than the printing device. For example, the present invention can be also applied not only to a facsimile, a copier, a register, a scanner, a computer, and a digital camera, each of which has two boards, but also to an automated teller machine or the like.

C8. Modified Example 8

The present invention can be realized by various aspects, and, for example, may be realized by a printer, a printer system, a printing control device, a computer, a data transmission and reception system, or the like. Also, the present invention can be realized by a printing control method, a data transmission and reception method, and a computer program used to realize these methods or functions of the devices, a recording medium which records the computer program, data signals realized in carrier waves by including the computer program, and the like.

What is claimed is:

1. A processing device, comprising:
    a first storage device that stores a correspondence table listing a correspondence relationship between data types and cipher strengths;
    a first data hardware processor that receives data and determines the data type of said received data itself based on whether the received data has a leading portion that identifies it as one of said data types, and based on content of the leading portion if the received data has the leading portion, said received data including individual data commands;
    a second data hardware processor that determines a cipher strength for the received data based on its determined data type and its corresponding cipher strength in the correspondence table stored in the first storage device;
    a data hardware encrypter that encrypts the received data according to its determined cipher strength;
    a second storage device that stores the encrypted data;
    a first connector that is connectable to an external device;
    a receiver that receives a data request input from the external device via the connector, the data request input requesting stored encrypted data in the second storage device;
    a second connector that is connectable to printer having a third data hardware processor that determines the cipher strength of the stored encrypted data requested by the data request input, and a data hardware decrypter that decrypts the requested stored encrypted data according to its determined cipher strength; and
    a transmitter that transmits the decrypted data to the external device via the connector;
    wherein the printer is responsive to printer command data, and wherein:
        said individual data commands include said printer command data;
        the data types in the correspondence table listed as having a corresponding cipher strength include a text data type, a graphic image data type, a printing condition data type, and a printer status data type; and
        said printer command data include a text-printing command whose leading portion identifies it as said text data type, a graphic-image-printing command whose leading portion identifies it as said graphic image data type, a printing-condition-setting command whose leading portion identifies it as said printing condition data type, and a printer-status command whose leading portion identifies it as said printer status data type;
    wherein the first data hardware processor, the second data hardware processor and the data hardware encrypter are implemented by at least one hardware processor.

2. The processing device as set forth in claim 1, wherein the data stored in the second storage device includes at least one of fiscal data, including sales tax rate data, and electronic journal data, including confirmed sales transaction data.

3. A processing system, comprising a processing device and a printing device,
    wherein the processing device includes:
        a first storage device that stores a correspondence table listing a correspondence relationship between data types and cipher strengths, the data types in the correspondence table listed as having a corresponding cipher strength include a text data type, a graphic image data type, a printing condition data type, and a printer status data type;
        a command hardware processor that receives command data and determines the data type of said received command data itself based on whether the received command data has a leading portion that identifies it as one of said data types, and based on content of the leading portion if the received data has the leading portion, said received data including individual data commands;
        a first data hardware processor that determines a cipher strength for the received command data based on its determined data type and its corresponding cipher strength in the correspondence table stored in the first storage device;
        a data hardware encrypter that encrypts the received command data according to its determined cipher strength;
        a second storage device that holds the encrypted data; and
        a transmitter that transmits the encrypted command data to the printing device, wherein the printing device is responsive to printer command data included in the individual data commands, and the printer device includes:
- a receiver that receives the encrypted command data transmitted from the processing device;
- a second data hardware processor that determines the cipher strength of the encrypted command data received by the receiver;
- a data hardware decrypter that decrypts the encrypted command data received by the receiver based on the cipher strength determined by the second data processor; and
- a printing hardware controller that controls printing based on the command data decrypted by the data hardware decrypter, said printer command data including a text-printing command whose leading portion identifies it as said text data type, a graphic-image-printing command whose leading portion identifies it as said graphic image data type, a printing-condition-setting command whose leading portion identifies it as said printing condition data type; and a printer-status command whose leading portion identifies it as said printer status data type;

wherein the first data hardware processor and the data hardware encrypter are implemented by at least one hardware processor in the processing device; and wherein the second data hardware processor and the data hardware decrypter are implemented by at least one hardware processor in the printing device.

4. The processing device as set forth in claim 1, wherein the printer command data is effective for controlling the operation of the printer.

5. The processing device of claim 1, wherein:
text data has a higher corresponding cipher strength than graphics image data;
graphics image data has a higher corresponding cipher strength than printing condition setting data; and
printing condition setting data has a higher corresponding cipher strength than printer status data.

6. The processing device of claim 1, wherein each of said data type corresponds to a different cipher strength, and each cipher strength is characterized by requiring more computing resources than any cipher strength below it.

7. The processing device of claim 1, wherein in the correspondence table:
the cipher strength corresponding to the text data type is higher than the cipher strength corresponding to the graphic image data type,
the cipher strength corresponding to the graphic image data type is higher than the cipher strength corresponding to the printing condition data type, and
the cipher strength corresponding to the printer status data type indicates that no encryption is to be applied to the printer status data type.

8. The processing device as set forth in claim 1, wherein when a text character data is included in the received data, the first data processor determines that the received data is text.

9. The processing device as set forth in claim 1, wherein when the received data does not include text character data and the received data includes a graphic image printing command in the leading portion, the first data processor determines that the received data is a graphic image.

* * * * *